(12) United States Patent
Melamed

(10) Patent No.: US 10,086,895 B1
(45) Date of Patent: Oct. 2, 2018

(54) MULTI-FUNCTIONAL CONVERTIBLE STORAGE APPARATUS

(71) Applicant: Hooman M. Melamed, Marina Del Rey, CA (US)

(72) Inventor: Hooman M. Melamed, Marina Del Rey, CA (US)

(*) Notice: Subject to any disclaimer, the term of this patent is extended or adjusted under 35 U.S.C. 154(b) by 0 days.

(21) Appl. No.: 15/474,996

(22) Filed: Mar. 30, 2017

(51) Int. Cl.
- B60B 1/04 (2006.01)
- B62J 9/00 (2006.01)
- A45C 5/14 (2006.01)
- A45C 9/00 (2006.01)
- A45F 3/04 (2006.01)
- A45F 4/02 (2006.01)
- B62K 15/00 (2006.01)
- B62K 3/00 (2006.01)
- H02J 7/35 (2006.01)
- H02J 7/00 (2006.01)

(52) U.S. Cl.
CPC .............. *B62J 9/003* (2013.01); *A45C 5/146* (2013.01); *A45C 9/00* (2013.01); *A45F 3/04* (2013.01); *A45F 4/02* (2013.01); *B62K 3/002* (2013.01); *B62K 15/006* (2013.01); *H02J 7/0027* (2013.01); *H02J 7/355* (2013.01); *A45C 2009/005* (2013.01); *B62J 2300/004* (2013.01)

(58) Field of Classification Search
CPC .. A45C 5/14; A45C 5/146; A45C 9/00; A45F 3/04; A45F 4/02; B62K 3/002; B60B 1/04
See application file for complete search history.

(56) References Cited

U.S. PATENT DOCUMENTS

| | | | | |
|---|---|---|---|---|
| 6,460,866 | B1* | 10/2002 | Altschul | A45F 4/02 150/159 |
| 7,029,015 | B2* | 4/2006 | Lin | A45C 9/00 190/18 A |
| 7,134,677 | B2* | 11/2006 | Opsvik | B62K 3/002 280/87.041 |
| 7,431,311 | B2* | 10/2008 | Turner | A45F 3/04 190/18 A |
| 8,469,374 | B2* | 6/2013 | Graf Von Bismarck | A45C 5/146 280/30 |
| 9,090,274 | B1* | 7/2015 | Arjomand | B62K 3/002 |
| 2004/0262871 | A1* | 12/2004 | Schreuder | B60P 3/007 280/87.1 |
| 2008/0210728 | A1* | 9/2008 | Bihn | A45F 3/04 224/576 |
| 2010/0044174 | A1* | 2/2010 | Graf Von Bismarck | A45C 5/146 190/18 A |
| 2010/0213680 | A1* | 8/2010 | Massara | B62K 3/002 280/87.041 |

(Continued)

*Primary Examiner* — Hau V Phan
(74) *Attorney, Agent, or Firm* — Omni Legal Group; Omid E. Khalifeh; Ariana K. Santoro

(57) ABSTRACT

A multi-functional storage apparatus and system may comprise a storage unit such as a backpack, suitcase, briefcase, or other luggage item that is bodily integrated with a personal transportation device. A scooter embodiment may comprise a steering shaft terminating in a wheel and a first and a second wheeled foot plate configured to support and rollably transport the storage unit and, when optionally deployed, a user. An electrical power source may deliver electrical power to one or more mobile electronic devices transported by a user and may be integrated with the body of the apparatus as well.

10 Claims, 9 Drawing Sheets

(56) References Cited

U.S. PATENT DOCUMENTS

| | | | | |
|---|---|---|---|---|
| 2010/0231161 A1* | 9/2010 | Brown | ................... | B25H 3/02 |
| | | | | 320/101 |
| 2011/0162931 A1* | 7/2011 | Collins | ................... | A45C 5/14 |
| | | | | 190/8 |
| 2012/0286011 A1* | 11/2012 | Wegener | ................ | A45C 13/02 |
| | | | | 224/627 |
| 2013/0062377 A1* | 3/2013 | Turner | ................... | B62K 3/002 |
| | | | | 224/276 |
| 2014/0061273 A1* | 3/2014 | Bullivant | ................. | A45F 3/04 |
| | | | | 224/576 |
| 2015/0034402 A1* | 2/2015 | Dourado | ................... | A45F 3/04 |
| | | | | 180/181 |
| 2015/0366333 A1* | 12/2015 | Zhijian | ..................... | A45F 4/02 |
| | | | | 224/576 |

\* cited by examiner

MULTI-FUNCTIONAL CONVERTIBLE STORAGE APPARATUS

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to multi-functional luggage and, more particularly, to an apparatus configured to optionally be worn or ridden while concurrently operative to supply any personal electronic devices carried with the luggage with battery power.

BACKGROUND

People have frequently encountered difficulties associated with transporting their personal belongings. For instance, although common in the marketplace and convenient for carrying belongings on one's person, backpacks can be burdensome and cause a student, traveler, or working person to become tired from physically supporting such encumbrances over the course of transport. Transporting items, including heavy objects such as text books and personal electronic devices, for example, over some distances may be uncomfortable, deleterious to one's posture, and even ergonomically dangerous.

Another difficulty has been to ensure that one's personal electronic devices may retain electrical power over the course of travel, especially in the event that the availability of grid-connected power in transit or at an intended destination may be limited or otherwise uncertain.

Information relevant to attempts to address these problems can be found in, for example, U.S. Pat. No. 6,460,866 to Altschul et al. for a combination wheeled vehicle and article carrier; U.S. U.S. Pat. No. 6,688,614 to Hsu for a slidable bag/box; U.S. Pat. No. 7,431,311 to Turner et al. disclosing a convertible combination scooter backpack; U.S. Pat. No. 7,837,206 to Lee for a carrier for items that is convertible to a wheeled scooter; U.S. Pat. No. 8,282,113 to Veal et al. teaching rideable luggage; and U.S. Pat. Pub. No. 2008/0210728 to Bihn disclosing a backpack with a solar energy panel. However, each of these references suffers from one or more of the following disadvantages: stowage of a wheeled or scooter portion may be difficult and/or unsightly; the assembly may be arranged so as to uncomfortably situate a stowed scooter portion against a wearer's back when not in use; and the arrangement of wheels may be unbalanced.

For the foregoing reasons, there remains a need for an improved multi-functional carrier or storage device that is able to optionally transport a person.

SUMMARY

The present disclosure is directed to a multi-functional convertible storage apparatus such as a backpack, suitcase, briefcase, or other luggage item. In addition to being adapted to removably contain a variety of personal effects, the storage apparatus comprises means for self-transportation, including a first and a second wheeled foot plate, as well as means for providing electrical power to any mobile electronic devices which may be removably contained by the storage unit.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the personal transport device may be a rollable scooter having elements that may be hingedly and pivotally deployed to rest on a floor or other surface from within one or more cavities defined by the wearable storage unit. When not in use, or when a rider prefers to carry the storage unit on his person, each of the first and second wheeled foot plates may be pivotally and hingedly stowed within such one or more cavities defined by the wearable storage unit. In order to preserve any aesthetic appearance of the storage unit, one or more flaps may be configured to conceal the stowed foot plates from view.

With more particularity, the personal transport device may comprise a telescoping handle defined by a steering shaft arranged to penetrate the wearable storage unit. Such steerable shaft may terminate in a wheel disposed beneath the wearable storage unit. Additionally, the first and second foot plate may each comprise an at least semi-rigid, elongated plank. Means for hingedly and pivotally securing each foot plate to the shaft may be disposed along a first proximal end of each plank, while a wheel may be disposed on an underside of a second, distal end of each plank. Any pivot hinge or other hinging mechanism known to those skilled in the art may be used for this purpose. Thus, it should be understood that any mechanism operative to permit folding the foot plates downward, into an open position, and then horizontally pivoting the foot plates for more comfortable use may be used to link each foot plate to the shaft.

Each of the foot plates may be linked to the shaft either directly or by way of an intermediary structure. For instance, in some embodiments, an additional structure may be included to space the foot pates away from the steerable shaft. As an example, the steerable shaft may penetrate a rigid board to which each of the first and second foot plates may be hingedly and pivotally linked. In another embodiment, the first and second foot plates may be hingedly and pivotally linked directly to a rigid structure defining the wearable storage unit, such as a bottom portion of the storage unit, penetrated by the steerable shaft.

The wearable storage unit may itself take innumerable forms. As a non-limiting example, the storage unit may be formed as a backpack, or even as a soft-shelled backpack, known to those skilled in the art, and of course comprising the aforementioned at least one cavity for receiving and/or concealing each of the foot plates. As another non-limiting example, the wearable storage unit may be a suitcase or a brief case. The storage unit may comprise any of canvas, vinyl, leather, nylon, polycarbonate, plastic, metal and any other man-made or synthetic material or combination of the same suitable for use in retaining and transporting a variety of personal items.

In an embodiment, the multi-functional storage apparatus may even comprise means for delivering electrical power to any mobile electronic devices additionally transported by a user with the storage apparatus as well. Thus it is contemplated that a wearer or rider or other user of the apparatus may ensure that any mobile electronic that they wish to carry with them may remain electrically charged over the course of transit, or even where grid-connected power is not readily available. For instance, a student, worker, traveler, or other user of the apparatus may use the apparatus to supply electrical power to his or her cellular phone, smart phone, tablet computer, or even lap top computer. Other mobile electronic devices, such as blue tooth headphones or speakers, among others, may also derive power from the apparatus. In some embodiments, the means for supplying electrical power to any of the mobile electronic devices may be a solar panel, known to those skilled in the art, disposed in any convenient manner on an outward facing portion of the storage unit. A battery may be provided and electrically communicatively linked to the solar panel to receive and store energy generated therefrom. Then, a charging cord, also known to those skilled in the art, in electrical communication with the battery may be provided to transfer power from the battery to a mobile electronic device.

Thus, it is an object of the invention to provide a convertible storage apparatus capable of rollably transporting a user.

It is another object of the invention to bodily integrate aspects of the invention into a single body to ease transportation of a person and his belongings.

It is still another object of the invention to maintain electrical power in a mobile electronic device over the course of travel.

One or more of the above-disclosed embodiments, in addition to certain alternatives, are provided in further detail below with reference to the attached figures. The disclosed subject matter is not, however, limited to any particular embodiment disclosed.

Figure 1:
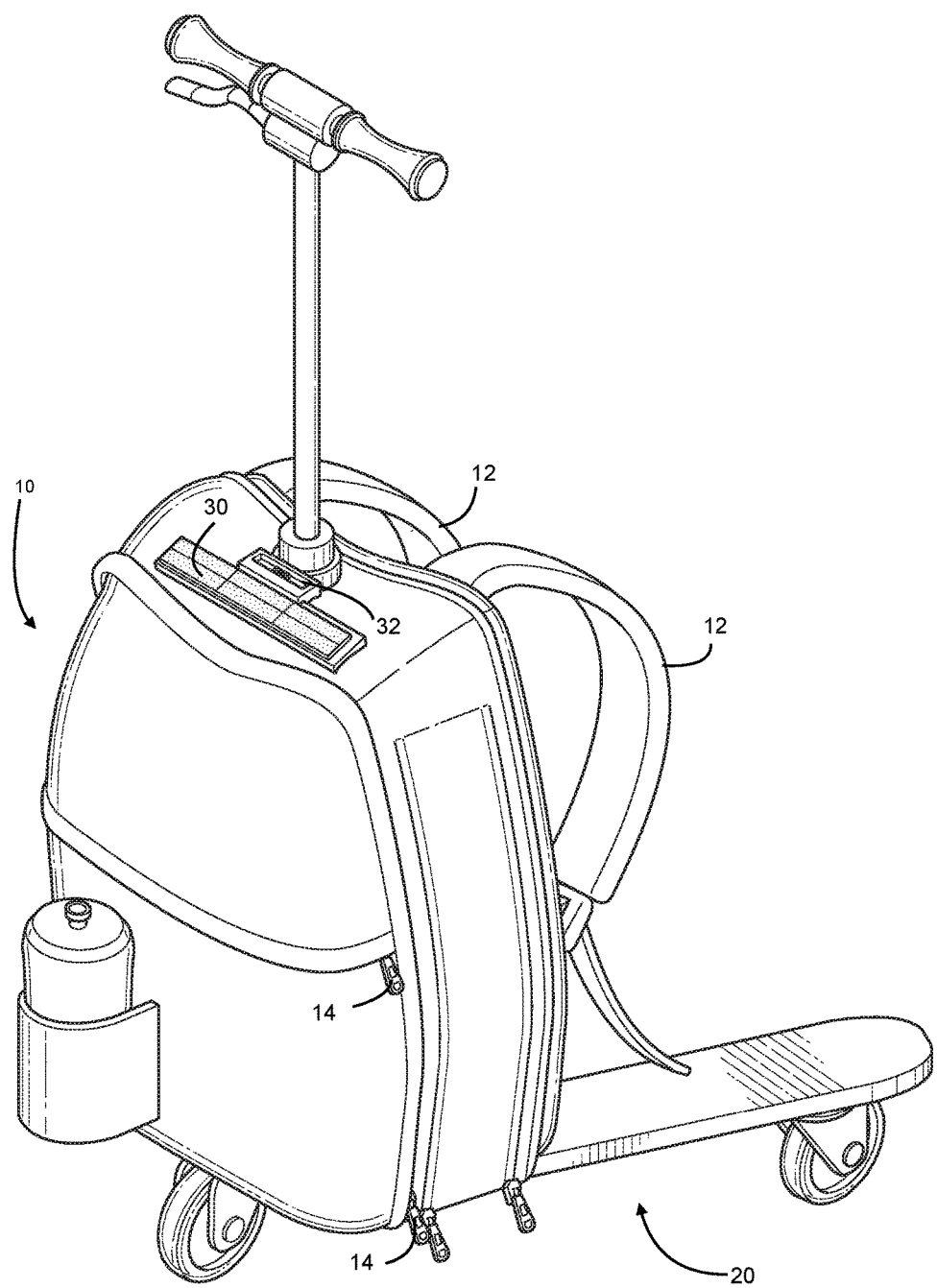
FIG. 1 shows a front perspective view of a multi-functional convertible storage apparatus in accordance with one embodiment of the invention.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

Figure 2:
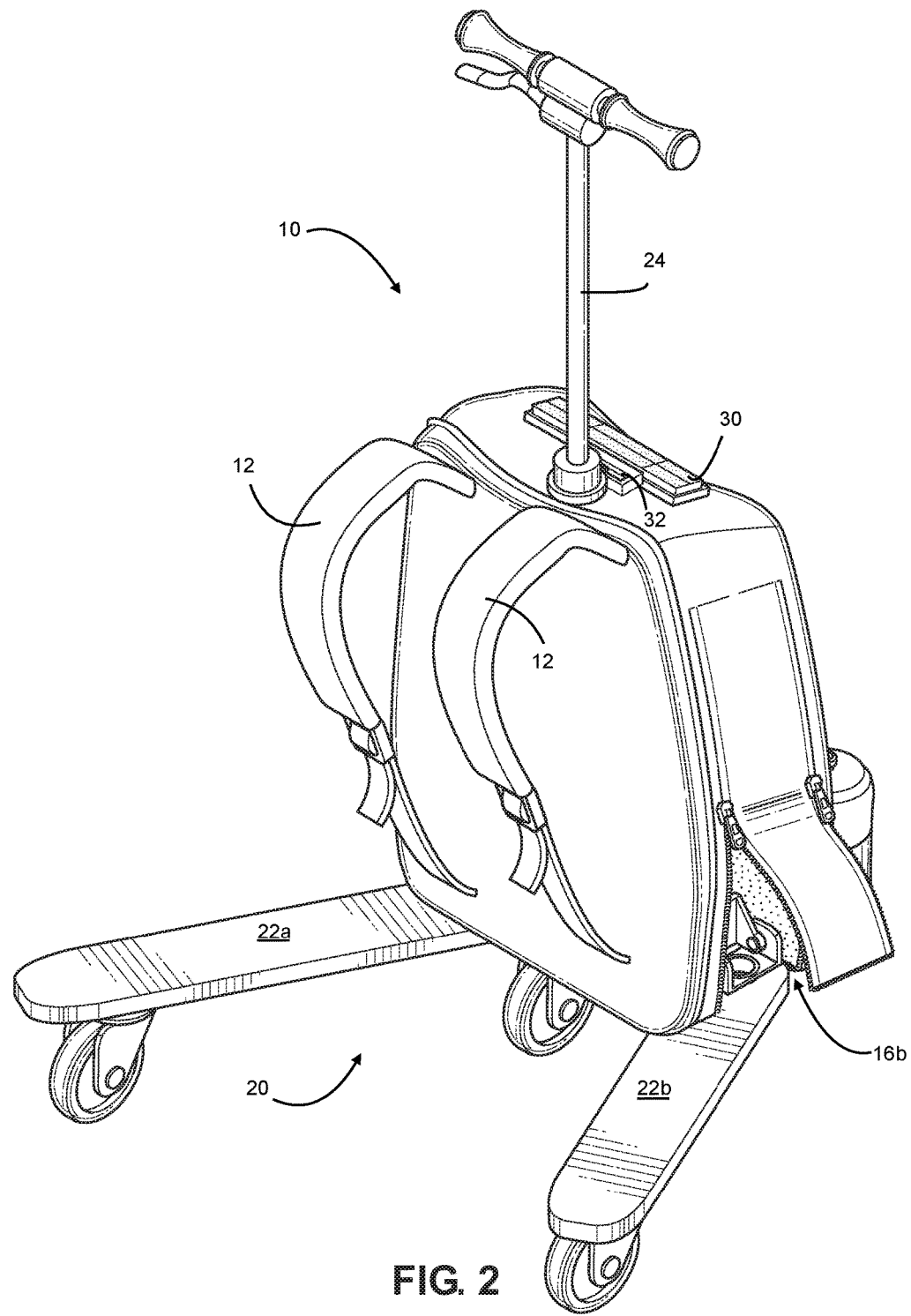
FIG. 2 shows a rear perspective view of a multi-functional convertible storage apparatus in accordance with one embodiment of the invention.

With reference to FIGS. 1 and 2 the apparatus herein described may comprise, in general, a storage unit, such as the exemplary soft-shelled backpack 10 drawn for the sake of brevity and clarity in the drawings, and a transport device, such as a scooter 20 integrated into the body of the storage unit. For the sake of brevity, the storage unit and transport device will be referred to as a backpack and scooter, respectively, however, it is to be understood that many other types of storage units and transportation devices may comprise the multi-functional and convertible apparatus without departing from the invention.

The backpack 10 may take any form operable to receive and retain a variety of personal effects, such as books, writing utensils, medications, electronic devices, food stuffs, and others, that a user may wish to transport on his person and may even comprise one or more straps 12 to permit wearing the device. In some embodiments, any cavities defined by the backpack 10 or other storage unit may be accessible by way of slidable zippers 14 also known to those skilled in the art.

In some embodiments, a solar panel 30 may be disposed on an outward-facing portion of the backpack 10 or other storage unit to collect solar energy to ultimately power a user's mobile electronic device, if desired. As such a charging cord in electrical communication with the solar panel, and terminating for example as a dock 32, may be externally accessible to the user.

With particular reference to FIG. 2, it may be seen that the scooter 20 portion of the apparatus may comprise a first and second foot plate 22a, 22b respectively accessible from within a first cavity (not visible in the figure) and second cavity 16 formed in the backpack 10 or other storage unit. Each cavity may be concealed by way of a flap 18 formed in the backpack to preserve the aesthetic appearance of the apparatus. This concealment is shown in particular in FIG. 4. In an embodiment, wheel 40a may similarly be concealed in any desirable manner, however, it is also contemplated that such wheel 40a may remain unconcealed to permit a user to rollably drag or push the apparatus along the ground while each of the foot plates 22a, 22b remains collapsed within any cavities defined by exemplary storage unit.

Figure 3A:
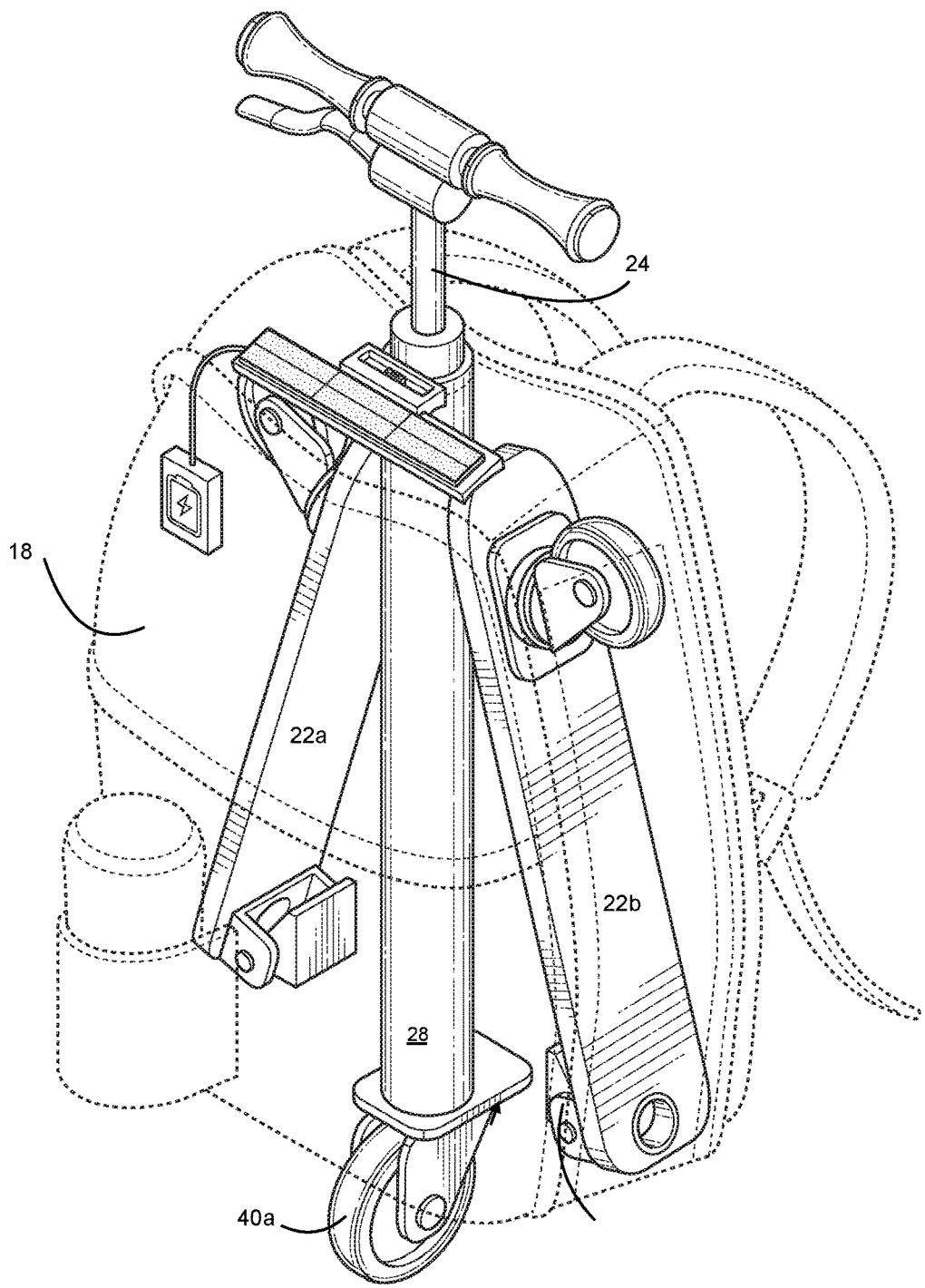
FIGS. 3A and 3B illustrate alternative skeletal embodiments of a multi-functional convertible storage apparatus.

The transport device may further comprise a telescoping handle 24 itself comprising a steerable shaft penetrating the backpack 10. The scooter 20 structure may be better viewed and understood with reference to FIGS. 3A and 3B, which illustrate possible embodiments of the transport device bodily integrated with and collapsed within the exemplary storage unit in alternative skeletal forms. With reference first to FIG. 3A, it may be seen that the shaft 26 penetrates a cavity 18 defined by the backpack 10 or other storage unit and is arranged so that the telescoping handle 24 may protrude from a top portion of the backpack 10 and terminate with a wheel 40a disposed beneath a bottom portion of the backpack 10. The shaft 26 may be rotated along a vertical access using the telescoping handle 24, in order to optionally steer the direction travelled by the wheel 40a.

The first and second foot plates 22a, 22b may be stowed within the backpack 10 as well. In an embodiment, the first and second foot plates 22a, 22b may be hingedly and pivotally deployed from their position within the storage unit. Thus, it may be seen that a pivot hinge 25, such as any of those known in the art, or other suitable mechanism may be used to secure each foot plate 22a, 22b within the storage unit. In another embodiment, such as in FIG. 3B, each foot plate 22a, 22b may be hingedly and pivotally secured to an intermediate structure, such as board 28 configured to space each of the foot plates 22a, 22b away from the steerable shaft 26 in some embodiments, an additional structure may be included to space the foot pates away from the steerable shaft. As an example, the steerable shaft 26 may penetrate a rigid board 28 to which each of the first and second foot plates 22a, 22b may be hingedly and pivotally linked.

According to one possible embodiment of the foot plates 22a, 22b, the first and second foot plates 22a, 22b may each comprise an at least semi-rigid, elongated plank. Aforementioned means for hingedly and pivotally securing each foot plate to the shaft may be disposed along a end of each plank proximal to the steerable shaft 26, while a wheel 40b may be disposed on an underside of a second end of each plank distal to the steerable shaft 26. Providing each wheel 40b as a castor wheel as drawn in the figures may be beneficial because such wheels are responsive to changes in direction, which may improve and generally ease the rider's use of the apparatus. However, the wheels 40b may take many other forms, and one skilled in the art will recognize that the foregoing will not limit the invention. When hingedly and pivotally deployed, the wheels 40b disposed on the underside of the foot plates 22a, 22b may define a plane, with the wheel 40a, which may be rollably traversable by the convertible apparatus.

Figure 3B:
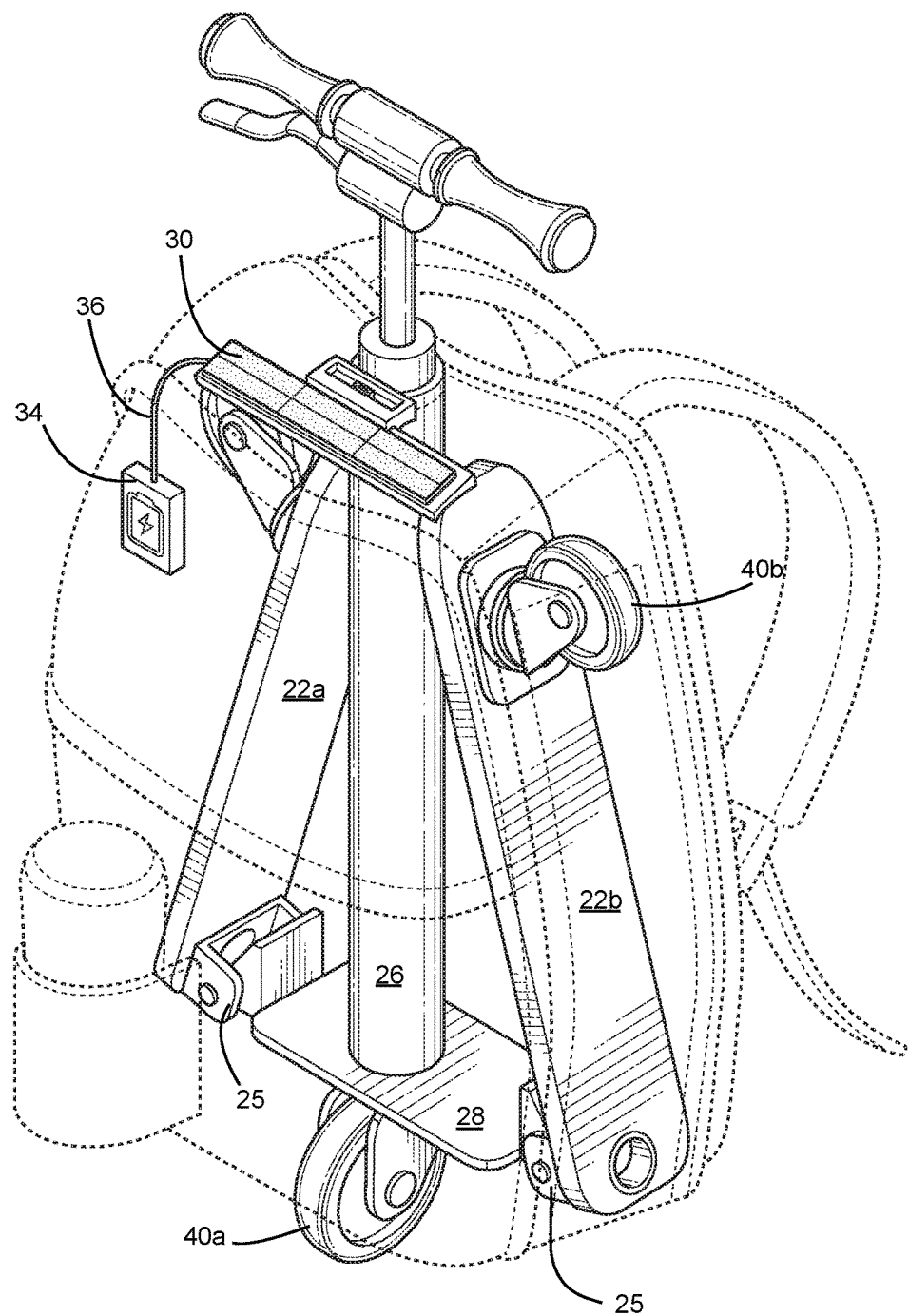

Exemplary means for delivering electrical power to any mobile electronic devices additionally transported by a user with the storage apparatus may be observed with reference to the skeletal drawings of FIGS. 3A and 3B as well. With continued reference to FIG. 3B, in some embodiments, the means for supplying electrical power to any of the mobile electronic devices may be a solar panel 30 comprising a plurality of monocrystalline cells as known to those skilled in the art. The solar capacity of the panel 30 may be about 1 to about 7 watts, and disposed in any convenient manner on an outward facing portion of the backpack 10. It is contemplated that the solar panel 30 will be positioned with at least a slight upward angle relative to a front-facing portion of the backpack 10 so as to capture energy from solar rays emanating out of the sky. A battery 32 may be provided and electrically communicatively linked, such as by a cord 36 to the solar panel 30 to receive and store energy generated therefrom. Then, a charging apparatus, also known to those skilled in the art, such as a cord or dock 32 in electrical communication with the battery 34 may be provided to transfer power from the battery 34 to a mobile electronic device.

Thus, it is contemplated that a wearer or rider or other user of the convertible apparatus may ensure that any mobile electronic that they wish to carry with them may remain electrically charged over the course of transit, or even where grid-connected power is not readily available. For instance, a student, worker, traveler, or other user of the apparatus may use the apparatus to supply electrical power to his or her cellular phone, smart phone, tablet computer, or even lap top computer. Other mobile electronic devices, such as blue tooth headphones or speakers, among others, may also derive power from the apparatus.

Figure 4:
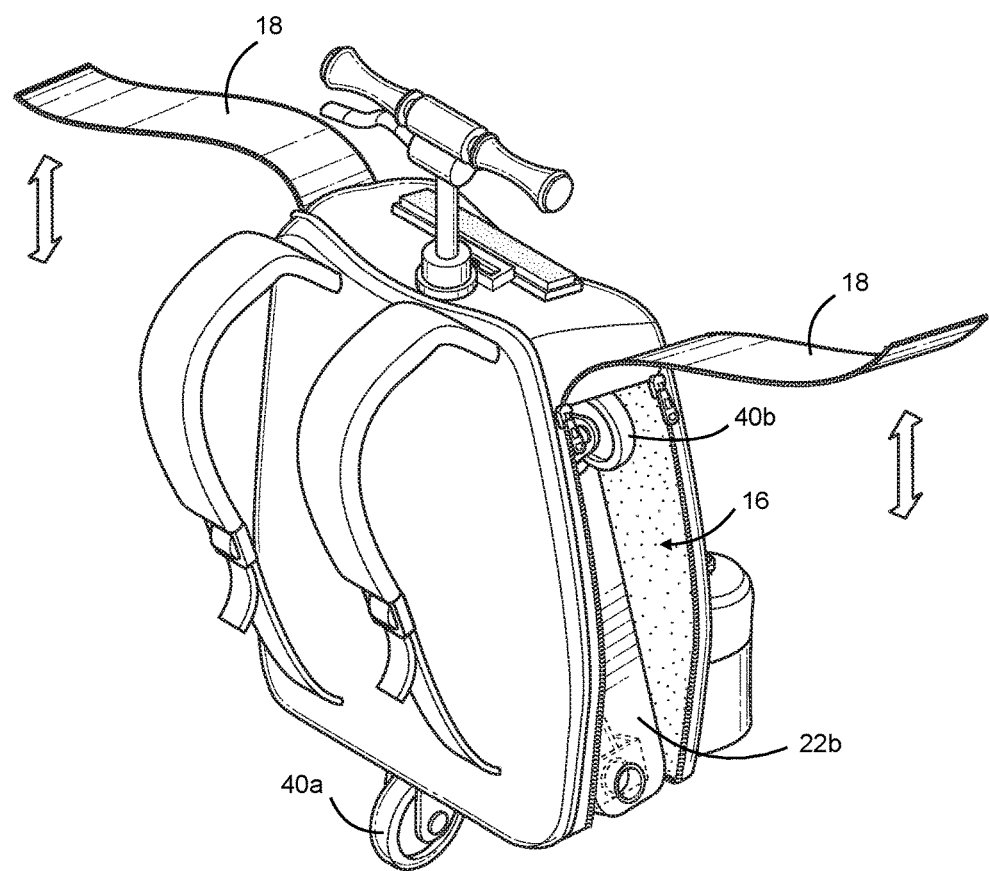
FIGS. 4-6 illustrate successive views of the multi-functional convertible storage apparatus being deployed for use.

Finally, conversion of the apparatus from wearable storage unit to rideable scooter may be seen with reference, in succession, to FIGS. 4-7. First, as shown in FIG. 4, flaps 18 may be lifted to reveal cavity 16 defined by the backpack 10 or other storage unit as well as each foot plate 22b (where foot plate 22a is obscured from view in this figure) and wheel 40b, contained therein.

Figure 5:
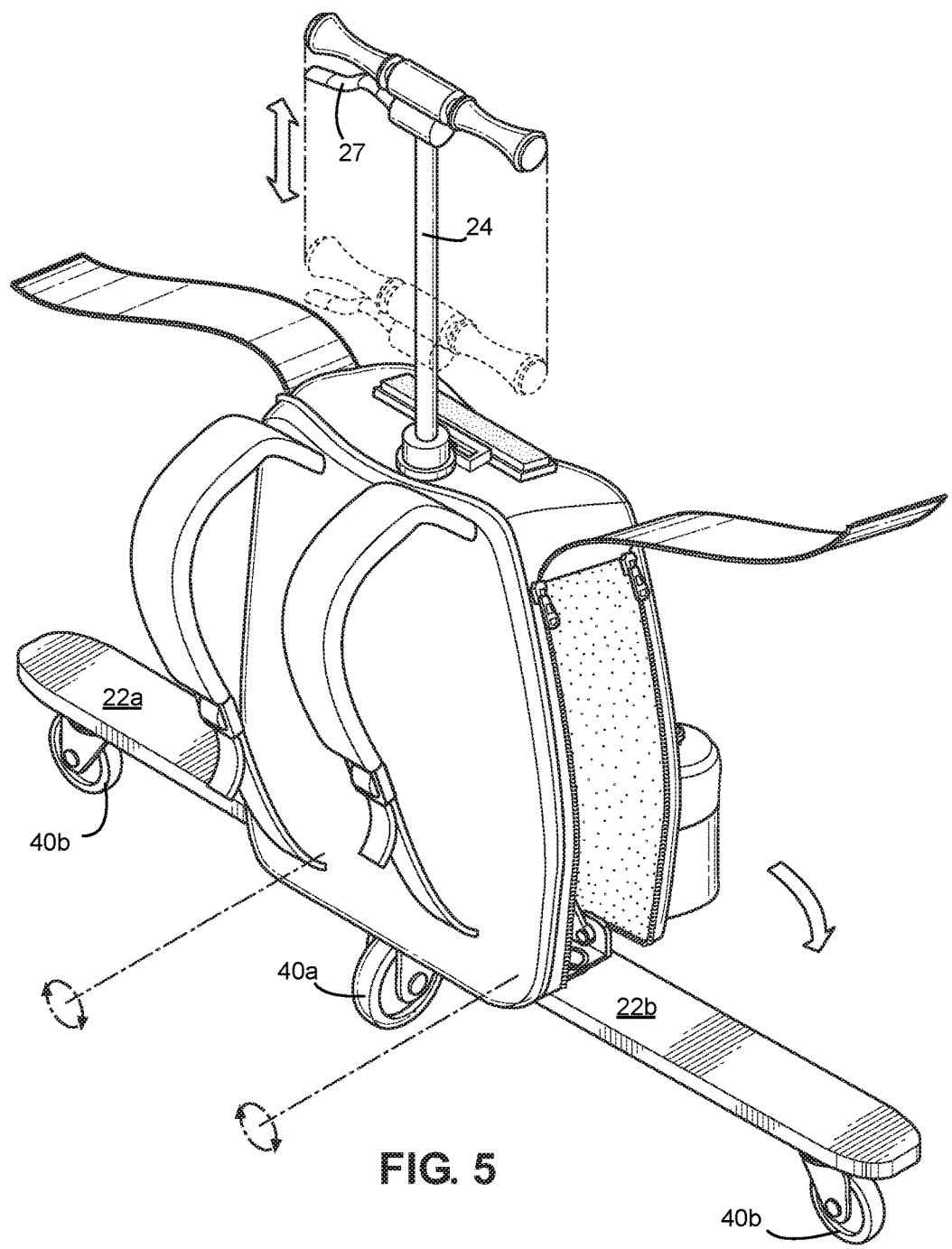

Next, as seen in FIG. 5, each foot plate 22a, 22b may hinge downward so that each wheel 40a, 40b may define a traversable plane. In addition, the telescoping handle 24 may extend upward to ease a user's reach and ability to steer the apparatus. It should be further noted that the convertible apparatus may further comprise means for arresting movement of any of the wheels 40a, 40b such as a handbrake 27, or any other brake known in the art. For instance, a footbrake may be disposed on either or both of the foot plates 22a, 22b to arrest either or both of such wheels 40b by foot.

Figure 6:
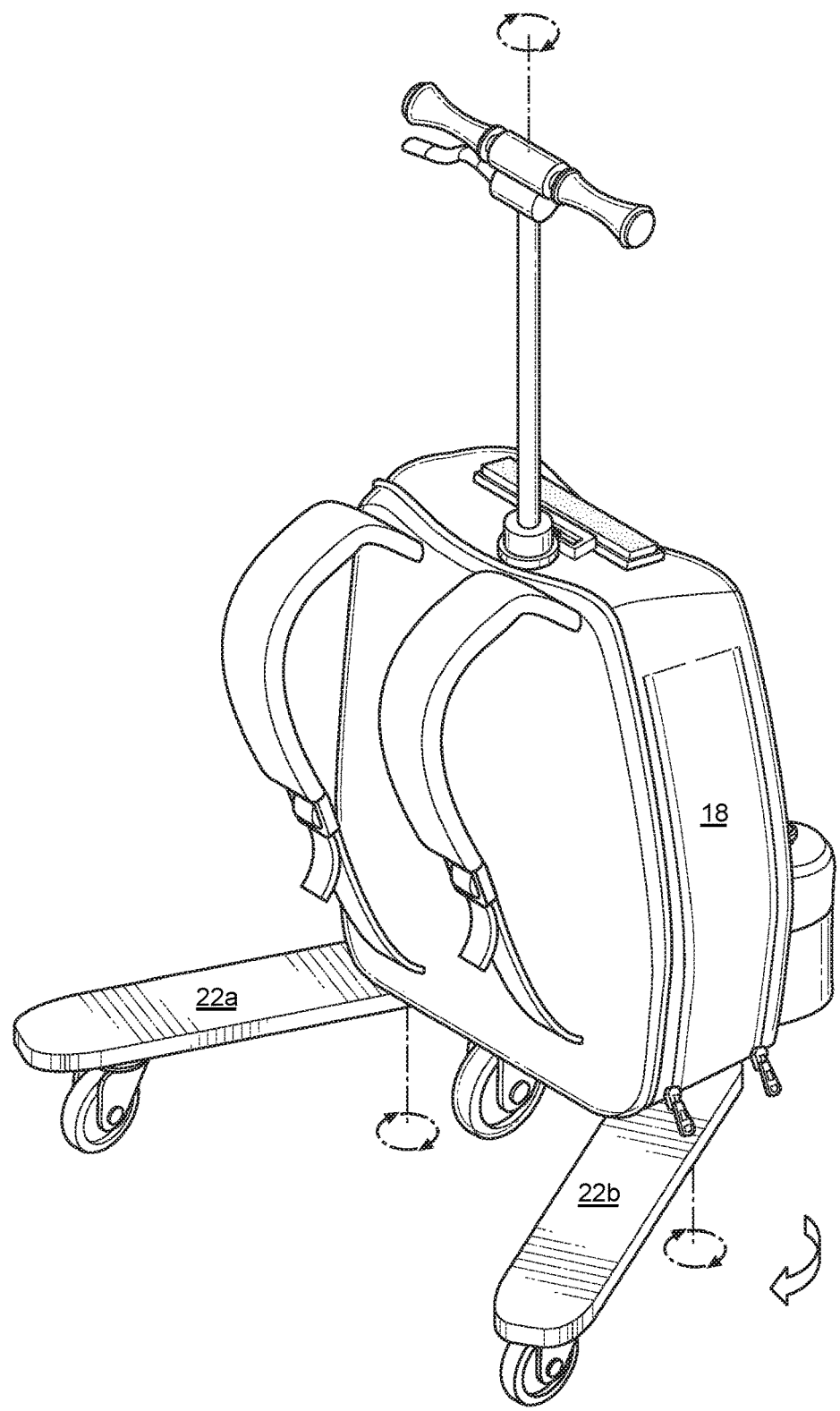

Then, with reference to FIG. 6 it may be seen that flap 18 may be closed to conceal any possibly unsightly cavities in the storage unit, and each foot plate 22a, 22b may be pivoted rearward to make such foot plates 22a, 22b more comfortably accessible to a rider desiring to use the apparatus as a scooter. It is contemplated that a position of each foot plate 22a, 22b may be optionally lockable so that the converted scooter may be ridden without fear that either or both of the foot plates 22a, 22b may independently pivot while in motion.

It may be seen that the telescoping handle 24, which defines the obscured shaft, is rotatable along a vertical axis to steer wheel 40a.

Figure 7:
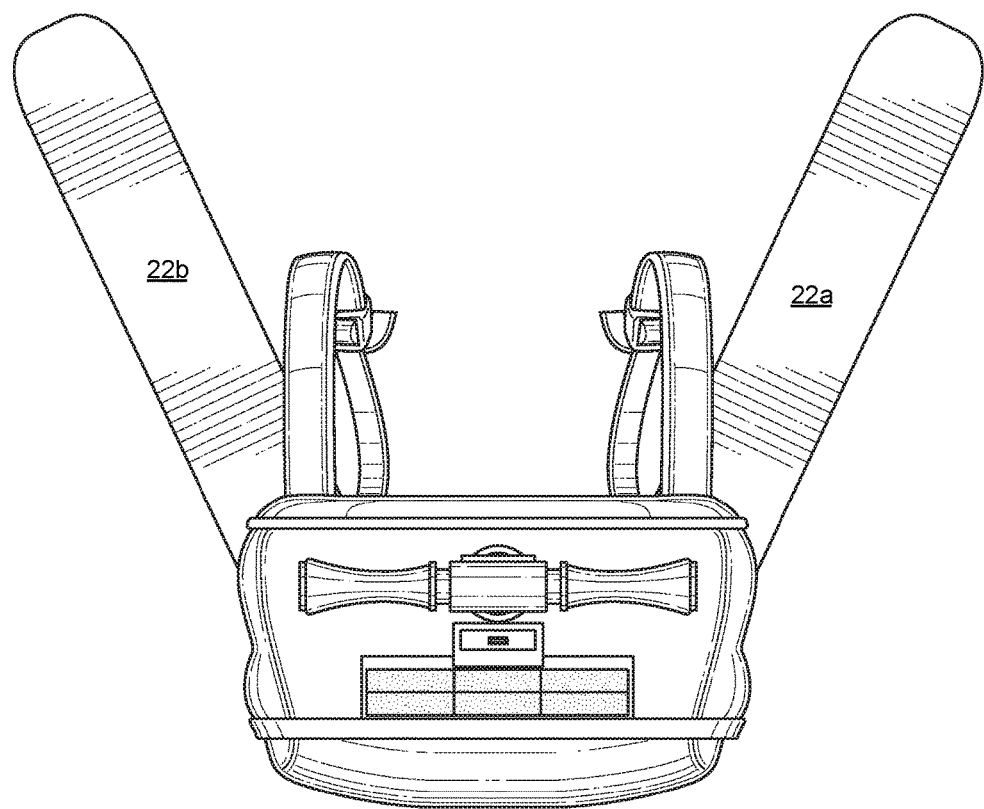
FIG. 7 shows a plan view of a top side of a multi-functional convertible storage apparatus in accordance with one embodiment of the invention.
Figure 8:
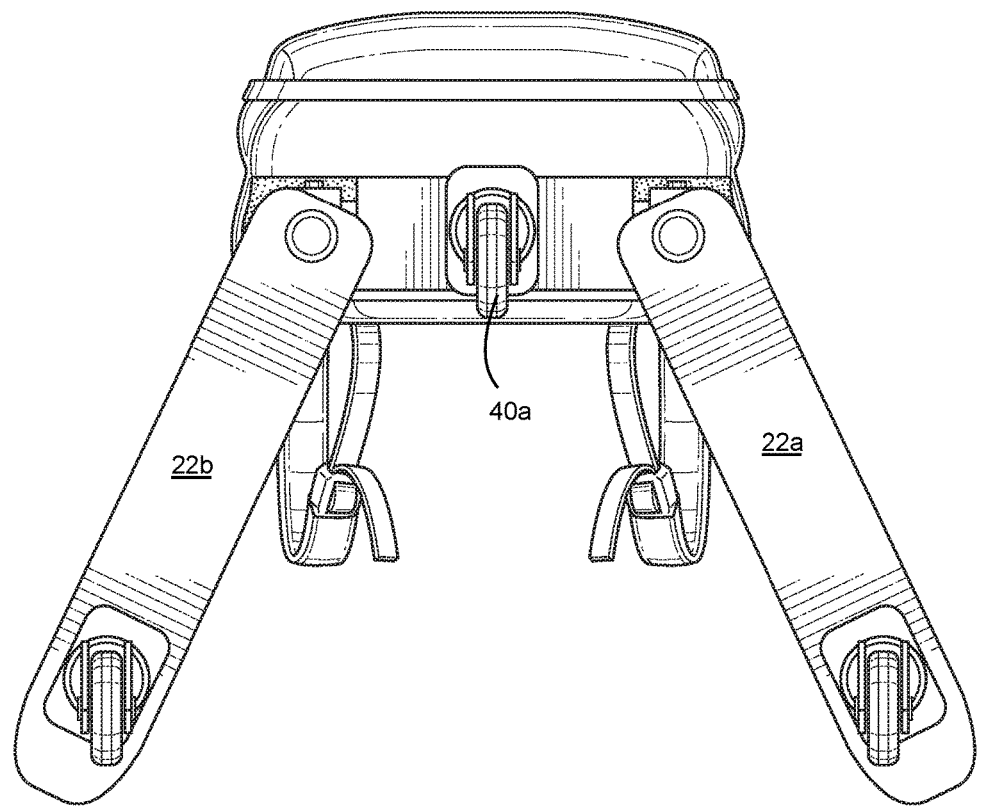
FIG. 8 shows a plan view of an underside of a multi-functional convertible storage apparatus in accordance with one embodiment of the invention.

As shown in FIG. 7, each of the foot plates 22a, 22b may define a self-supporting v-shape, with a vertex approximately defined by the position of wheel 40a shown in FIG. 8. Any angle defined by the foot plates 22a, 22b may be adjustable or fixed as may be desirable to accommodate unique riding needs of various users.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, the type, quality, and quality of storage compartments integrated into the body of the storage apparatus should not be seen to limit the invention. Means of separating the steerable shaft and footplates contained within the storage unit from person effects contained therein are contemplated. Additionally, innumerable aesthetic features, including any colors presented by various elements comprising the multi-functional convertible storage apparatus. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the multi-functional convertible storage apparatus with which that terminology is associated. In general, the terms used in the following claims should not be constructed to limit the multi-functional convertible storage apparatus to the specific embodiments disclosed in the specification unless the above description section explicitly define such terms. Accordingly, the actual scope encompasses not only the disclosed embodiments, but also all equivalent ways of practicing or implementing the disclosed apparatus. The above description of embodiments of the multi-functional convertible storage apparatus is not intended to be exhaustive or limited to the precise form disclosed above or to a particular field of usage.

While specific embodiments of, and examples for, the apparatus are described above for illustrative purposes, various equivalent modifications are possible for which those skilled in the relevant art will recognize.

While certain aspects of the method and system disclosed are presented below in particular claim forms, various aspects of the apparatus are contemplated in any number of claim forms. Thus, the inventor reserves the right to add additional claims after filing the application to pursue such additional claim forms for other aspects of the multi-functional convertible storage apparatus.

What is claimed is:

1. A multi-functional, convertible storage apparatus, comprising:
    a wearable storage unit configured to receive and retain a plurality of personal effects and further defining a first side cavity and a second side cavity;
    an optionally deployable transport device bodily integrated with the storage unit, the transport device comprising:
        a telescoping handle defining a steerable shaft penetrating the wearable storage unit and terminating in a wheel disposed beneath the wearable storage unit,
        a first elongated foot plate and a second elongated foot plate hingedly and pivotally deployable from within the first side cavity and the second side cavity of the wearable storage unit, and
        a first wheel and a second wheel respectively disposed beneath the first foot plate and the second foot plate in a position distal to the shaft; and
    a battery configured to receive electrical power, store electrical power, and deliver electrical power to at least one mobile electronic device.

2. The convertible storage apparatus of claim 1, further comprising a brake configured to arrest at least one wheel.

3. The convertible storage apparatus of claim 1, wherein the wearable storage unit comprises a first pouch configured to receive the first footplate and a second pouch configured to conceal the second footplate.

4. The convertible storage unit of claim 1, wherein the wearable storage unit comprises a first adjustable strap and a second adjustable strap disposed along an outer back side of the wearable storage unit.

5. The convertible storage unit of claim 1, further comprising:
    at least one solar panel attached to an outward-facing portion of the wearable storage unit, wherein the at least one solar power is configured to deliver electrical power to the battery; and
    a charging cord in electrical communication with the battery, the cord operative to deliver electrical power to the mobile electronic device.

6. A multi-functional, convertible storage apparatus, comprising:
    a wearable storage unit configured to receive and retain a plurality of personal effects and further defining a first side cavity and a second side cavity; and
    an optionally deployable transport device bodily integrated with the storage unit, the transport device comprising:
    a) a telescoping handle defining a steerable shaft penetrating the wearable storage unit and terminating in a wheel disposed beneath the wearable storage unit;
    b) a first elongated foot plate and a second elongated foot plate hingedly and pivotally deployable from within the first side cavity and the second side cavity of the wearable storage unit; and
    c) a first wheel and a second wheel respectively disposed beneath the first foot plate and the second foot plate in a position distal to the shaft.

7. The convertible storage apparatus of claim 6, further comprising a brake configured to arrest at least one wheel.

8. The convertible storage apparatus of claim 6, wherein the wearable storage unit comprises a first pouch configured to receive the first elongated footplate and a second pouch configured to conceal the second elongated footplate.

9. The convertible storage unit of claim 6, wherein the wearable storage unit comprises a first adjustable strap and a second adjustable strap disposed along an outer back side of the wearable storage unit.

10. The convertible storage unit of claim 6, further comprising:
    a) at least one solar panel attached to an outward-facing portion of the wearable storage unit;
    b) at least one battery in electrical communication with the at least one solar panel assembly; and
    c) a charging cord in electrical communication with the battery, the cord operative to deliver power to at least one mobile electronic device.

* * * * *